US009245538B1

(12) United States Patent
Avendano et al.

(10) Patent No.: US 9,245,538 B1
(45) Date of Patent: Jan. 26, 2016

(54) BANDWIDTH ENHANCEMENT OF SPEECH SIGNALS ASSISTED BY NOISE REDUCTION

(75) Inventors: Carlos Avendano, Campbell, CA (US); Carlo Murgia, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 12/907,788

(22) Filed: Oct. 19, 2010

Related U.S. Application Data

(60) Provisional application No. 61/346,801, filed on May 20, 2010.

(51) Int. Cl.
*G10L 21/00* (2013.01)
*H04B 15/00* (2006.01)
*G10L 25/90* (2013.01)

(52) U.S. Cl.
CPC .................................... *G10L 25/90* (2013.01)

(58) Field of Classification Search
USPC .................................................... 704/207
See application file for complete search history.

(56) References Cited

U.S. PATENT DOCUMENTS 5,050,217 A * 9/1991 Orban .......................... 381/94.2
5,950,153 A * 9/1999 Ohmori et al. ................ 704/217
6,289,311 B1 * 9/2001 Omori et al. .................. 704/268
6,453,289 B1 * 9/2002 Ertem et al. .................. 704/225
6,480,610 B1 * 11/2002 Fang et al. .................... 381/321
6,539,355 B1 * 3/2003 Omori et al. .................. 704/268
6,757,395 B1 * 6/2004 Fang et al. ................... 381/94.3
7,343,282 B2 * 3/2008 Kirla et al. .................... 704/212
7,379,866 B2 * 5/2008 Gao ............................. 704/220
7,461,003 B1 * 12/2008 Tanrikulu ...................... 704/500
7,546,237 B2 * 6/2009 Nongpiur et al. ............. 704/209
7,792,680 B2 * 9/2010 Iser et al. ...................... 704/500
7,813,931 B2 * 10/2010 Hetherington et al. ....... 704/500
8,032,364 B1 * 10/2011 Watts ........................... 704/226
8,112,284 B2 * 2/2012 Kjorling et al. ............... 704/500
8,190,429 B2 * 5/2012 Iser et al. ...................... 704/223
8,194,880 B2 * 6/2012 Avendano ....................... 381/92
8,204,252 B1 * 6/2012 Avendano .................... 381/94.7
8,249,861 B2 * 8/2012 Li et al. ......................... 704/205
8,271,292 B2 * 9/2012 Osada et al. .................. 704/500
8,280,730 B2 * 10/2012 Song et al. .................... 704/225
8,438,026 B2 * 5/2013 Fischer et al. ................ 704/243
2002/0052734 A1 * 5/2002 Unno et al. ................... 704/207
2002/0128839 A1 * 9/2002 Lindgren et al. .............. 704/258
2004/0153313 A1 * 8/2004 Aubauer et al. .............. 704/206
2005/0049857 A1 * 3/2005 Seltzer et al. ................. 704/226
2005/0267741 A1 * 12/2005 Laaksonen et al. ........... 704/209
2006/0116874 A1 * 6/2006 Samuelsson et al. ......... 704/228

(Continued)

*Primary Examiner* — David Hudspeth
*Assistant Examiner* — Timothy Nguyen
(74) *Attorney, Agent, or Firm* — Carr & Ferrell LLP

(57) ABSTRACT

The present technology provides robust, high quality expansion of the speech within a narrow bandwidth acoustic signal which can overcome or substantially alleviate problems associated with expanding the bandwidth of the noise within the acoustic signal. The present technology carries out a multifaceted analysis to accurately identify noise within the narrow bandwidth acoustic signal. Noise classification information regarding the noise within the narrow bandwidth acoustic signal is used to determine whether to expand the bandwidth of the narrow bandwidth acoustic signal. By expanding the bandwidth based on the noise classification information, the present technology can expand the speech bandwidth of the narrow bandwidth acoustic signal and prevent or limit the bandwidth expansion of the noise.

20 Claims, 11 Drawing Sheets

(56) References Cited

U.S. PATENT DOCUMENTS

| | | | | |
|---|---|---|---|---|
| 2006/0247922 | A1* | 11/2006 | Hetherington et al. | 704/208 |
| 2007/0005351 | A1* | 1/2007 | Sathyendra et al. | 704/223 |
| 2007/0154031 | A1* | 7/2007 | Avendano et al. | 381/92 |
| 2008/0215344 | A1* | 9/2008 | Song et al. | 704/500 |
| 2009/0150144 | A1* | 6/2009 | Nongpiur et al. | 704/233 |
| 2009/0287496 | A1* | 11/2009 | Thyssen et al. | 704/500 |
| 2009/0299742 | A1* | 12/2009 | Toman et al. | 704/233 |
| 2009/0323982 | A1* | 12/2009 | Solbach et al. | 381/94.3 |
| 2010/0063807 | A1* | 3/2010 | Archibald et al. | 704/226 |
| 2010/0076756 | A1* | 3/2010 | Douglas et al. | 704/226 |
| 2010/0087220 | A1* | 4/2010 | Zheng et al. | 455/522 |
| 2010/0094643 | A1* | 4/2010 | Avendano et al. | 704/502 |
| 2010/0223054 | A1* | 9/2010 | Nemer et al. | 704/219 |
| 2011/0019833 | A1* | 1/2011 | Kuech et al. | 381/66 |
| 2011/0019838 | A1* | 1/2011 | Kaulberg et al. | 381/98 |
| 2011/0081026 | A1* | 4/2011 | Ramakrishnan et al. | 381/94.3 |
| 2011/0191101 | A1* | 8/2011 | Uhle et al. | 704/205 |

* cited by examiner

BANDWIDTH ENHANCEMENT OF SPEECH SIGNALS ASSISTED BY NOISE REDUCTION

CROSS-REFERENCE TO RELATED APPLICATIONS

This application claims the benefit of U.S. Provisional Application No. 61/346,801, filed on May 20, 2010, entitled "Bandwidth Expansion Based on Noise Suppression", which is incorporated by reference herein.

BACKGROUND

1. Field of the Invention

The present invention relates generally to audio processing, and more particularly to techniques for expanding the speech bandwidth of an acoustic signal.

2. Description of Related Art

Various types of audio devices such as cellular phones, laptop computers and conferencing systems present an acoustic signal through one or more speakers, so that a person using the audio device can hear the acoustic signal. In a typical conversation, a far-end acoustic signal of a remote person speaking at the "far-end" is transmitted over a communication network to an audio device of a person listening at the "near-end."

These communication networks often have bandwidth limitations that impact the speech quality of the acoustic signal when compared to other audio sources such as CD and DVD. For example, telephone networks typically limit the bandwidth of an acoustic signal to frequencies between 300 Hz and 3500 Hz, although speech may contain frequency components up to 10 kHz. As a result, speech transmitted using only this limited bandwidth sounds thin and dull due to the lack of low and high frequency components in the acoustic signal, which limits speech quality. In addition, this limited bandwidth can adversely impact the intelligibility of the speech, which can interfere with normal communication and is annoying.

Bandwidth expansion techniques can be used to reconstruct missing frequency components to artificially increase the bandwidth of the narrow band acoustic signal in an attempt to improve speech quality. Typically the missing frequency components are reconstructed by performing frequency folding, whereby the narrow-band acoustic signal is upsampled and filtered to form an expanded wide band acoustic signal.

A specific issue arising in bandwidth expansion concerns the bandwidth expansion of the noise within the acoustic signal. Specifically, since speech is typically a non-stationary signal which changes and contains pauses over time, the upsampling can also result in the bandwidth expansion of the noise present in the narrow band acoustic signal. This expansion of the noise is undesirable for a number of reasons. For example, the noise bandwidth expansion can result in audible artifacts which degrade the intelligibility of speech in the expanded wide band acoustic signal. In addition, in some instances the expansion of the noise may degrade the intelligibility of speech to below the intelligibility of the narrow band acoustic signal, which causes the speech quality to worsen rather than improve.

It is therefore desirable to provide systems and methods for expanding the speech bandwidth of an acoustic signal which can overcome or substantially alleviate problems associated with expanding the noise bandwidth.

SUMMARY

The present technology provides robust, high quality expansion of the speech within a narrow bandwidth acoustic signal which can overcome or substantially alleviate problems associated with expanding the bandwidth of the noise within the acoustic signal. The present technology carries out a multi-faceted analysis to accurately identify noise within the narrow bandwidth acoustic signal. Noise classification information regarding the noise within the narrow bandwidth acoustic signal is used to determine whether to expand the bandwidth of the narrow bandwidth acoustic signal. By expanding the bandwidth based on the noise classification information, the present technology can expand the speech bandwidth of the narrow bandwidth acoustic signal and prevent or limit the bandwidth expansion of the noise.

A method for expanding a bandwidth of an acoustic signal as described herein includes receiving an acoustic signal having a noise component and a speech component. The speech component has spectral values within a first bandwidth. An expanded signal segment is then formed having spectral values within a second bandwidth outside the first bandwidth. The spectral values of the expanded signal segment are based on the spectral values of the speech component and further based on an energy level of the noise component. An expanded acoustic signal is then formed based on the acoustic signal and the signal segment.

A system for expanding a spectral bandwidth of an acoustic signal as described herein includes a noise reduction module to determine an energy level of a noise component in an acoustic signal having the noise component and a speech component. The speech component has spectral values within a first bandwidth. The system further includes a bandwidth expansion module to form an expanded signal segment having spectral values within a second bandwidth outside the first bandwidth. The spectral values of the expanded signal are based on the spectral values of the speech component and further based on the determined energy level of the noise component. The bandwidth expansion module then forms an expanded acoustic signal based on the speech component and the expanded signal segment.

A computer readable storage medium as described herein has embodied thereon a program executable by a processor to perform a method for expanding a spectral bandwidth of an acoustic signal as described above.

Other aspects and advantages of the present invention can be seen on review of the drawings, the detailed description, and the claims which follow.

DETAILED DESCRIPTION

The present technology provides robust, high quality expansion of the speech within a narrow bandwidth acoustic signal which can overcome or substantially alleviate problems associated with expanding the bandwidth of the noise within the acoustic signal. The present technology carries out a multi-faceted analysis to accurately identify noise within the narrow bandwidth acoustic signal. Noise classification information regarding the noise within the narrow bandwidth acoustic signal is used to determine whether to expand the bandwidth of the narrow bandwidth acoustic signal. By expanding the bandwidth based on the noise classification information, the present technology can expand the speech bandwidth of the narrow bandwidth acoustic signal and prevent or limit the bandwidth expansion of the noise.

Embodiments of the present technology may be practiced on any audio device that is configured to receive and/or provide audio such as, but not limited to, cellular phones, phone handsets, headsets, and conferencing systems. While some embodiments of the present technology will be described in reference to operation on a cellular phone, the present technology may be practiced on any audio device.

Figure 1:
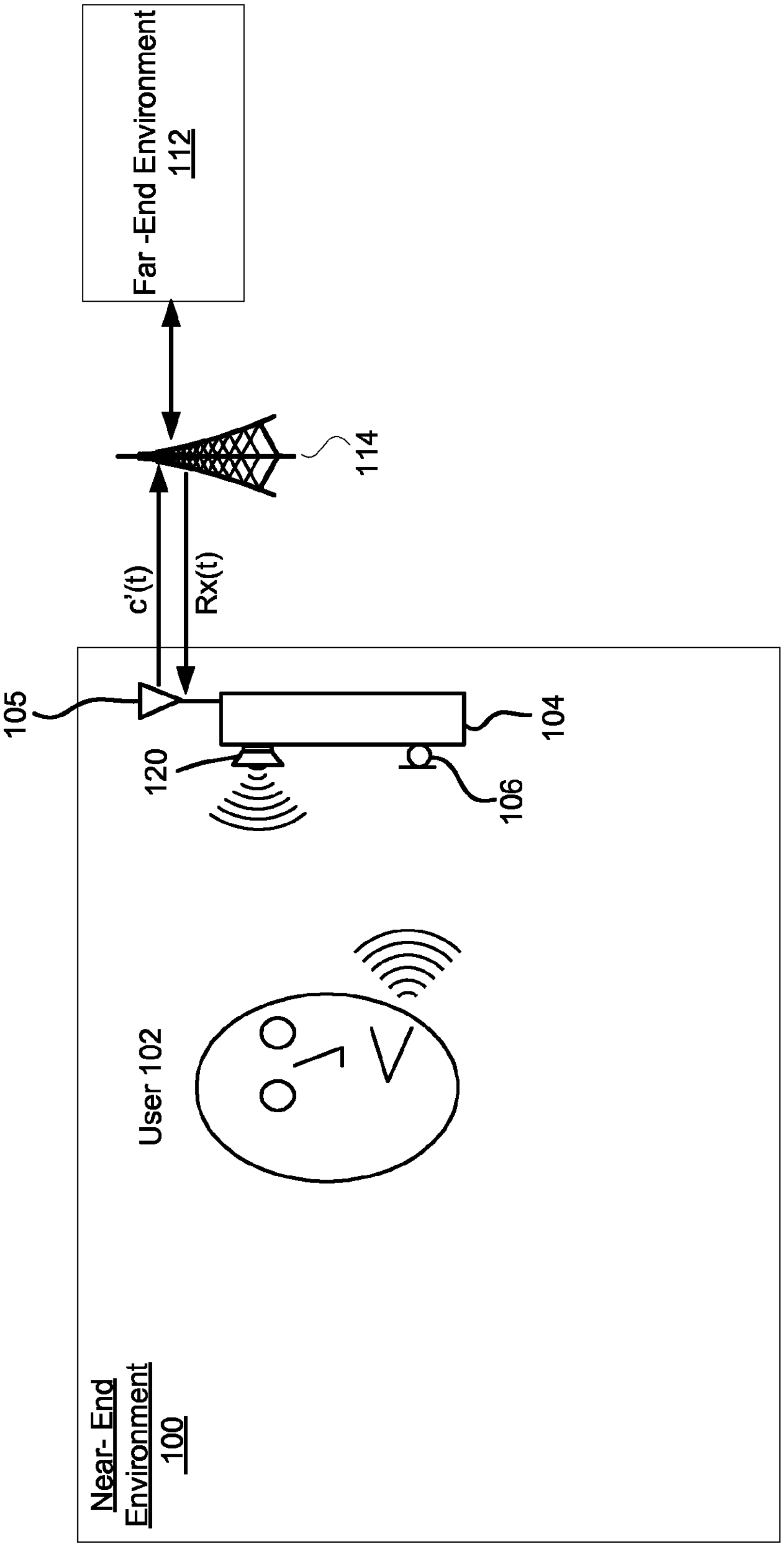
FIG. 1 is an illustration of an environment in which embodiments of the present technology may be used.

FIG. 1 is an illustration of an environment in which embodiments of the present technology may be used. An audio device 104 may act as a source of audio content to a user 102 in a near-end environment 100. In the illustrated embodiment, the audio content provided by the audio device 104 includes a far-end acoustic signal Rx(t) wirelessly received over a communications network 114 via an antenna device 105. Alternatively, the audio content provided by the audio device 104 may for example be stored on a storage media such as a memory device, an integrated circuit, a CD, a DVD, etc for playback to the user 102.

The far-end acoustic signal Rx(t) comprises speech from the far-end environment 112, such as speech of a remote person talking into a second audio device. The far-end acoustic signal Rx(t) may also contain noise from the far-end environment 112, as well as noise added by the communications network 114. Thus, the far-end acoustic signal Rx(t) may be represented as a superposition of a speech component s(t) and a noise component n(t). This may be represented mathematically as $Rx(t)=s(t)+n(t)$.

As used herein, the term "acoustic signal" refers to a signal derived from an acoustic wave corresponding to actual sounds, including acoustically derived electrical signals which represent an acoustic wave. For example, the far-end acoustic signal Rx(t) is an acoustically derived electrical signal that represents an acoustic wave in the far-end environment 112. The far-end acoustic signal Rx(t) can be processed to determine characteristics of the acoustic wave such as acoustic frequencies and amplitudes.

The communication network 114 typically imposes bandwidth limitations on the transmission of the far-end acoustic signal Rx(t). The bandwidth of the far-end acoustic signal Rx(t) can thus be much less than the bandwidth of the acoustic wave in the far-end environment 112 from which the far-end acoustic signal Rx(t) originated. In particular, the speech component s(t) has a bandwidth which can be much less than the speech source from which it originated. For example, telephone networks typically limit the bandwidth of an acoustic signal to frequencies between 300 Hz and 3500 Hz, although speech may contain frequency components up to 10 kHz. As a result, if the audio device 104 were to present the received far-end acoustic signal Rx(t) directly to the user 102 via audio transducer 120, the bandwidth limitations imposed by the communication network 114 limit speech quality and can adversely impact the intelligibility of the speech.

The exemplary audio device 104 also includes an audio processing system (not illustrated in FIG. 1) for expanding the spectral bandwidth of the speech component s(t) of the received far-end acoustic signal Rx(t), and prevent or limit the bandwidth expansion of the noise component n(t). As described below, the audio device 104 presents the far-end acoustic signal Rx(t) (or other desired audio signal) to the user 102 in the form of a noise reduced and bandwidth expanded acoustic signal Rx"(t). The expanded acoustic signal Rx"(t) is provided to the audio transducer 120 to generate an acoustic wave in the near-end environment 100, so that the user 102 or other desired listener can hear it.

The audio transducer 120 may for example be a loudspeaker, or any other type of audio transducer which generates an acoustic wave in response to an electrical signal. In the illustrated embodiment, the audio device 104 includes a single audio transducer 104. Alternatively, the audio device 104 may include more than one audio transducer.

In the illustrated embodiment, the audio device 104 includes a primary microphone 106. In some alternative embodiments, the microphone 106 may be omitted. In yet other embodiments, the audio device 104 may include more than one microphone.

While the primary microphone 106 receives sound (i.e. acoustic signals) from the user 102 or other desired speech source, the microphone 106 also picks up noise within the near-end environment 100. The noise may include any sounds from one or more locations that differ from the location of the user 102 or other desired source, and may include reverberations and echoes. The noise may be stationary, non-stationary, and/or a combination of both stationary and non-stationary noise. The total signal received by the primary microphone 106 is referred to herein as primary acoustic signal c(t).

In the illustrated embodiment, the audio device 104 also processes the primary acoustic signal c(t) to remove or reduce noise using the techniques described herein. A noise reduced acoustic signal c'(t) may then be transmitted by the audio device 104 to the far-end environment 112 via the communications network 114, and/or presented for playback to the user 102.

Figure 2:
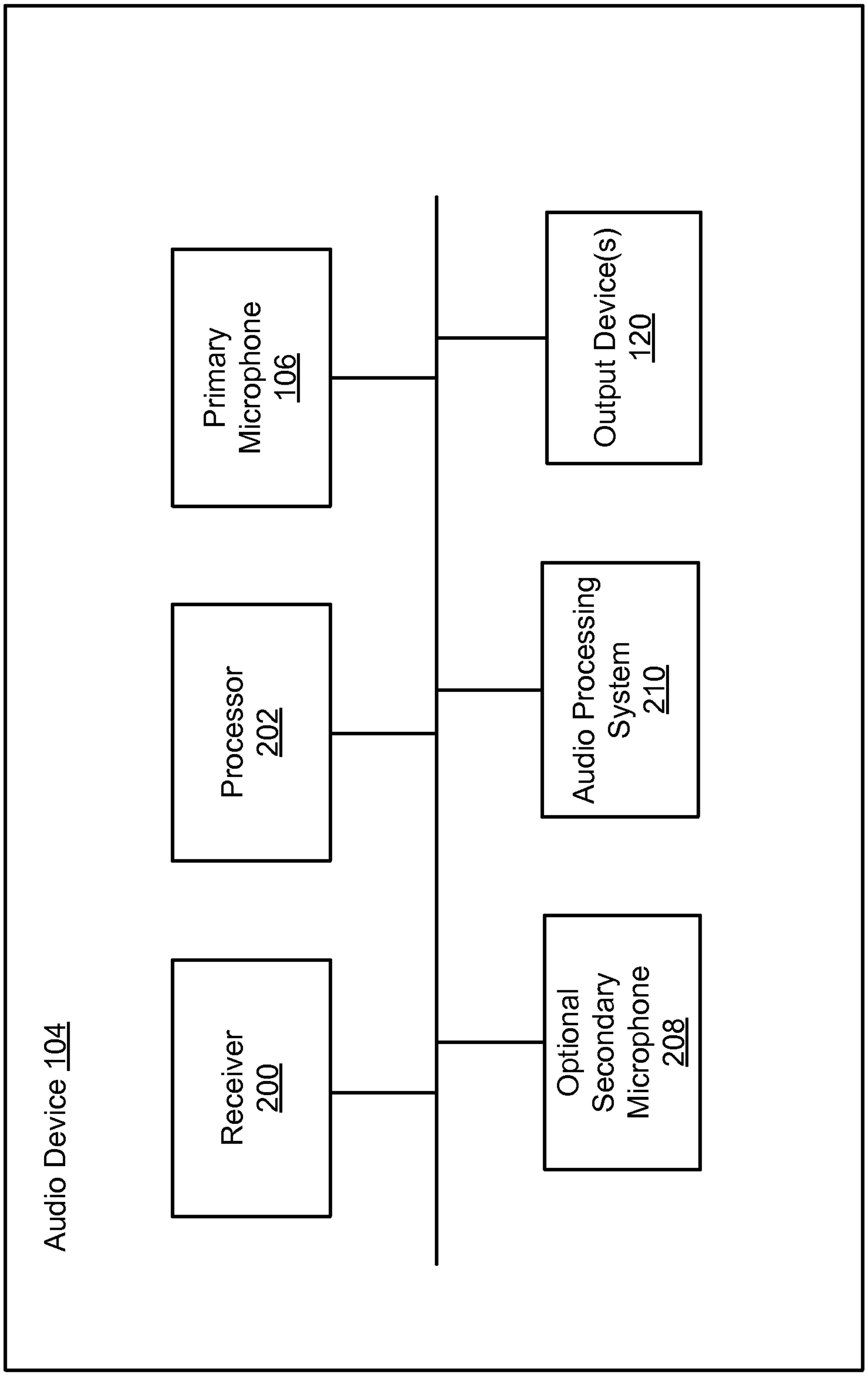
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device such as audio transducer 120. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including expanding a spectral bandwidth of an acoustic signal as described herein. Processor 202 may include hardware and software implemented as a processing unit, which may process floating point operations and other operations for the processor 202.

The exemplary receiver 200 is configured to receive the far-end acoustic signal Rx(t) from the communications network 114. In the illustrated embodiment the receiver 200 includes the antenna device 105. The far-end acoustic signal Rx(t) may then be forwarded to the audio processing system 210, which processes the signal Rx(t). This processing includes expanding the spectral bandwidth of the speech component s(t) of the acoustic signal Rx(t), and preventing or limiting the bandwidth expansion of the noise component n(t). In some embodiments, the audio processing system 210 may for example process data stored on a storage medium such as a memory device or an integrated circuit to produce a bandwidth expanded acoustic signal for playback to the user 102. The audio processing system 210 is discussed in more detail below.

Figure 3:
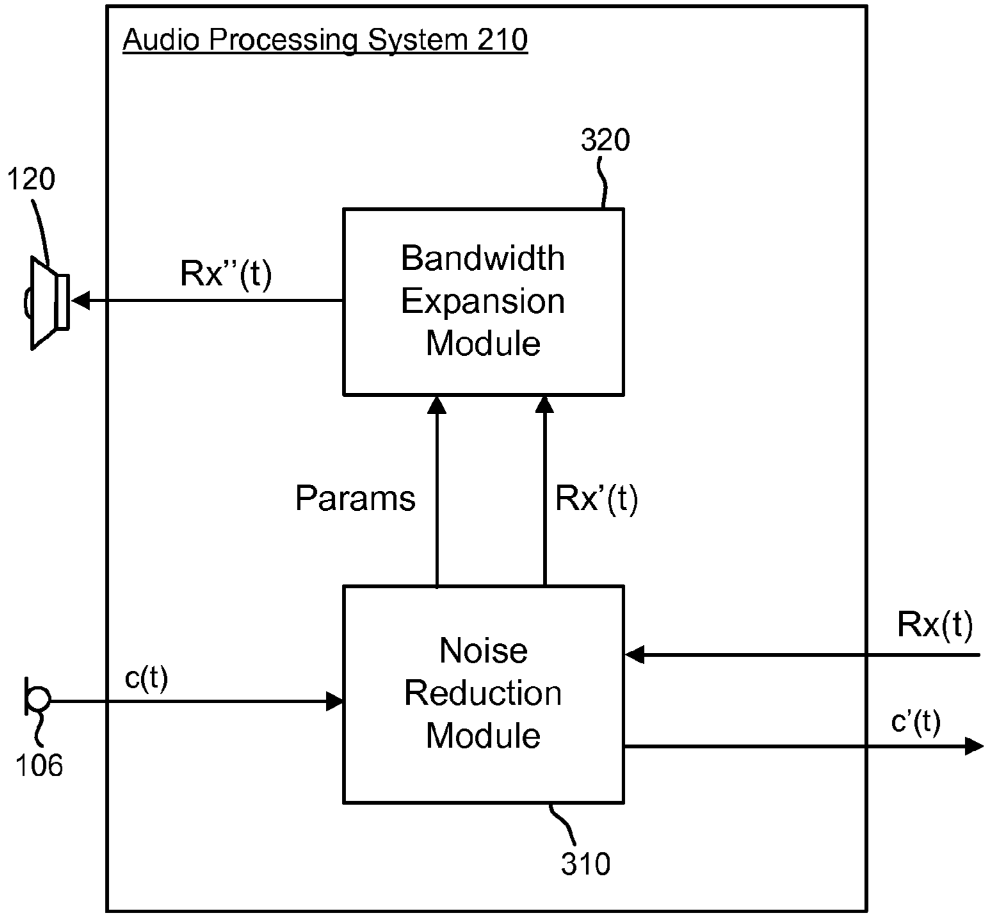
FIG. 3 is a block diagram of an exemplary audio processing system for expanding the spectral bandwidth of an acoustic signal as described herein.

FIG. 3 is a block diagram of an exemplary audio processing system 210 for performing bandwidth expansion of an acoustic signal as described herein. In the following discussion, the bandwidth expansion techniques will be carried out on the far-end acoustic signal Rx(t) to form noise reduced, bandwidth expanded acoustic signal Rx"(t). It will be understood that the techniques described herein can also or alternatively be utilized to perform bandwidth expansion on other acoustic signals.

In exemplary embodiments, the audio processing system 210 is embodied within a memory device within audio device 104. The audio processing system 210 may include a noise reduction module 310 and a bandwidth expansion module 320. Audio processing system 210 may include more or fewer components than those illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number and type of signals communicated between modules.

In operation, the primary acoustic signal c(t) received from the primary microphone 106 and the far-end acoustic signal Rx(t) received from the communications network 114 are processed through noise reduction module 310. The noise reduction module 310 performs noise reduction on the primary acoustic signal c(t) to form noise reduced acoustic signal c'(t). The noise reduction 310 also performs noise reduction on the far-end acoustic signal Rx(t) to form noise reduced acoustic signal Rx'(t).

In one embodiment, the noise reduction module 310 takes the acoustic signals and mimics the frequency analysis of the cochlea (e.g., cochlear domain), simulated by a filter bank, for each time frame. The noise reduction module 310 separates each of the primary acoustic signal c(t) and the far-end acoustic signal Rx(t) into two or more frequency sub-band signals. A sub-band signal is the result of a filtering operation on an input signal, where the bandwidth of the filter is narrower than the bandwidth of the signal received by the noise reduction module 310. Alternatively, other filters such as short-time Fourier transform (STFT), sub-band filter banks, modulated complex lapped transforms, cochlear models, wavelets, etc., can be used for the frequency analysis and synthesis.

Because most sounds (e.g. acoustic signals) are complex and include multiple components at different frequencies, a sub-band analysis on the acoustic signal is useful to separate the signal into frequency bands and determine what individual frequency components are present in the complex acoustic signal during a frame (e.g. a predetermined period of time). For example, the length of a frame may be 4 ms, 8 ms, or some other length of time. In some embodiments there may be no frame at all. The results may include sub-band signals in a fast cochlea transform (FCT) domain. The sub-band frame signals of the primary acoustic signal c(t) is expressed as c(k), and the sub-band frame signals of the far-end acoustic signal Rx(t) are expressed as Rx(k). The sub-band frame signals c(k) and Rx(k) may be time and frame dependent, and may vary from one frame to the next.

The noise reduction module 310 may process the sub-band frame signals to identify signal features, distinguish between speech components and noise components, and generate one or more signal modifiers. The noise reduction module 310 is responsible for modifying each of the sub-band frame signals c(k), Rx(k) by applying one or more corresponding signal modifiers, such as one or more multiplicative gain masks and/or subtractive operations. The modification may reduce noise and echo to preserve the desired speech components in the sub-band signals. Applying appropriate modifiers to the primary sub-band frame signals c(k) reduces the energy levels of a noise component in the primary sub-band frame signals c(k) to form masked sub-band frame signals c'(k). Similarly, applying appropriate modifiers to the sub-band frame signals Rx(k) reduces the energy levels of noise in the sub-band frame signals Rx(k) to form masked sub-band frame signals Rx'(k).

The noise reduction module 310 may convert the masked sub-band frame signals c'(k) from the cochlea domain back into the time domain to form a synthesized time domain noise reduced acoustic signal c'(t). The conversion may include adding the masked frequency sub-band signals c'(k) and may further include applying gains and/or phase shifts to the sub-band signals prior to the addition. Once conversion to the time domain is completed, the synthesized time-domain acoustic signal c'(t), wherein the noise has been reduced, may be provided to a codec for encoding and subsequent transmission by the audio device 104 to the far-end environment 112 via the communications network 114. In some embodiments, additional post-processing of the synthesized time-domain acoustic signal c'(t) may be performed. For example, comfort noise generated by a comfort noise generator may be added to the synthesized acoustic signal. Comfort noise may be a uniform constant noise that is not usually discernable to a listener (e.g., pink noise). This comfort noise may be added to the synthesized acoustic signal to enforce a threshold of audibility and to mask low-level non-stationary output noise components.

The noise reduction module 310 also converts the masked sub-band frame signals Rx'(k) from the cochlea domain back into the time domain to form a synthesized time domain noise reduced acoustic signal Rx'(t). The conversion may include adding the masked frequency sub-band signals Rx'(k) and may further include applying gains and/or phase shifts to the sub-band signals prior to the addition.

An example of the noise reduction module 310 in some embodiments is disclosed in U.S. patent application Ser. No. 12/860,043, titled "Monaural Noise suppression Based on Computational Auditory Scene Analysis", filed Aug. 20, 2010, the disclosure of which is incorporated herein by reference. For an audio device that utilizes two or more microphones, a suitable system for implementing noise reduction module 310 with the present technology is described in U.S. patent application Ser. No. 12/832,920, titled "Multi-Microphone Robust Noise Suppression", filed on Jul. 8, 2010, the disclosure of which is incorporated herein by reference.

Bandwidth expansion module 320 receives the noise reduced acoustic signal Rx'(t) from the noise reduction module 310. The bandwidth expansion module 320 also receives noise reduction parameters Params from the noise reduction module 310. The noise reduction parameters Params indicating characteristics of the noise reduction performed on the far-end acoustic signal Rx(t) by the noise reduction module 310. In other words, noise reduction parameters Params indicate characteristics of the speech and noise components s(t), n(t) within Rx(t), including the energy levels of the speech and noise components s(t), n(t). The values of the parameters Params may be time and sub-band signal dependent.

As described below, the bandwidth expansion module 310 uses the parameters Params to provide a sophisticated level of control over the bandwidth expansion performed to form bandwidth expanded acoustic signal Rx"(t). The bandwidth expanded acoustic signal Rx"(t) is provided to the audio transducer 120 to generate an acoustic wave in the near-end environment 100, so that the user 102 or other desired listener can hear it.

The bandwidth expansion module 320 uses the speech and noise information inferred by the values of the parameters Params to determine when and how to perform bandwidth expansion on the acoustic signal Rx'(t). For example, if the values of the parameters Params indicate that a frame of the acoustic signal Rx'(t) is dominated by speech, the bandwidth expansion module 320 can perform bandwidth expansion to form one or more expanded signal segments having spectral values outside the bandwidth of the acoustic signal Rx'(t). As described in more detail with respect to FIGS. 4 and 6, the expanded signal segment is formed based on the spectral values of the portions of the narrow band acoustic signal Rx'(t) which contain speech. As a result, the expanded signal segment can more closely resemble natural speech. The expanded acoustic signal Rx"(t) is then formed based on the expanded signal segment, thereby improving voice quality from the perspective of the listener. In other words, the expanded acoustic signal Rx"(t) emulates the wide bandwidth spectral values of the speech that are missing as a consequence of the bandwidth limitations imposed on the far-end acoustic signal Rx(t).

In contrast, if the parameters Params indicate that a frame of the acoustic signal Rx'(t) is dominated by noise, the bandwidth expansion module 320 can limit or prevent the bandwidth expansion during that frame. In doing so, the bandwidth expansion techniques described herein can expand the speech bandwidth of the far-end acoustic signal Rx(t), and prevent or limit the bandwidth expansion of the noise.

In some embodiments, the determination of whether or not to expand the bandwidth of the acoustic signal Rx'(t) is a binary determination. In other embodiments, a continuous soft decision approach can be used, whereby the spectral values of the expanded signal segment are weighted based on the values of the parameters Params.

The parameters Params provided by the noise reduction module 320 may include for example the noise mask values applied during the formation of the masked frequency sub-band signals Rx'(k) described above. The values of the noise mask indicate which sub-band frames are dominated by noise, and which sub-band frames are dominated by speech. The bandwidth expansion module 320 may use information inferred by the values of the noise mask, and any other parameters Params, to identify the frames of the acoustic signal Rx'(t) to ignore or otherwise restrict when performing bandwidth expansion.

The parameters Params may also include energy level estimates of the noise and speech within the sub-band signals Rx'(k). Determining energy level estimates is discussed in more detail in U.S. patent application Ser. No. 11/343,524, entitled "System and Method for Utilizing Inter-Microphone Level Differences for Speech Enhancement", which is incorporated by reference herein.

The parameters Params may also include an estimated speech-to-noise ratio (SNR) of the acoustic signal Rx'(t). The SNR may for example be a function of long-term peak speech energy to instantaneous or long-term noise energy. The long-term peak speech energy may be determined using one or more mechanisms based upon instantaneous speech and noise energy estimates. The mechanisms may include a peak speech level tracker, average speech energy in the highest×dB of the speech signal's dynamic range, reset the speech level tracker after a sudden drop in speech level, e.g. after shouting, apply lower bound to speech estimate at low frequencies (which may be below the fundamental component of the talker), smooth speech power and noise power across sub-bands, and add fixed biases to the speech power estimates and SNR so that they match the correct values for a set of oracle mixtures.

The parameters Params may also include a global voice activity detector (VAD) parameter indicating whether speech is dominant within a particular frame. The VAD may for example be 3-way, where VAD(t)=1 indicates a speech frame, VAD(t)=−1 indicates a noise frame, and VAD(t)=0 is not definitively either a speech frame or a noise frame. The parameters Params may also include pitch saliency, which is a measure of harmonicity of the acoustic signal Rx'(t).

Figure 4:
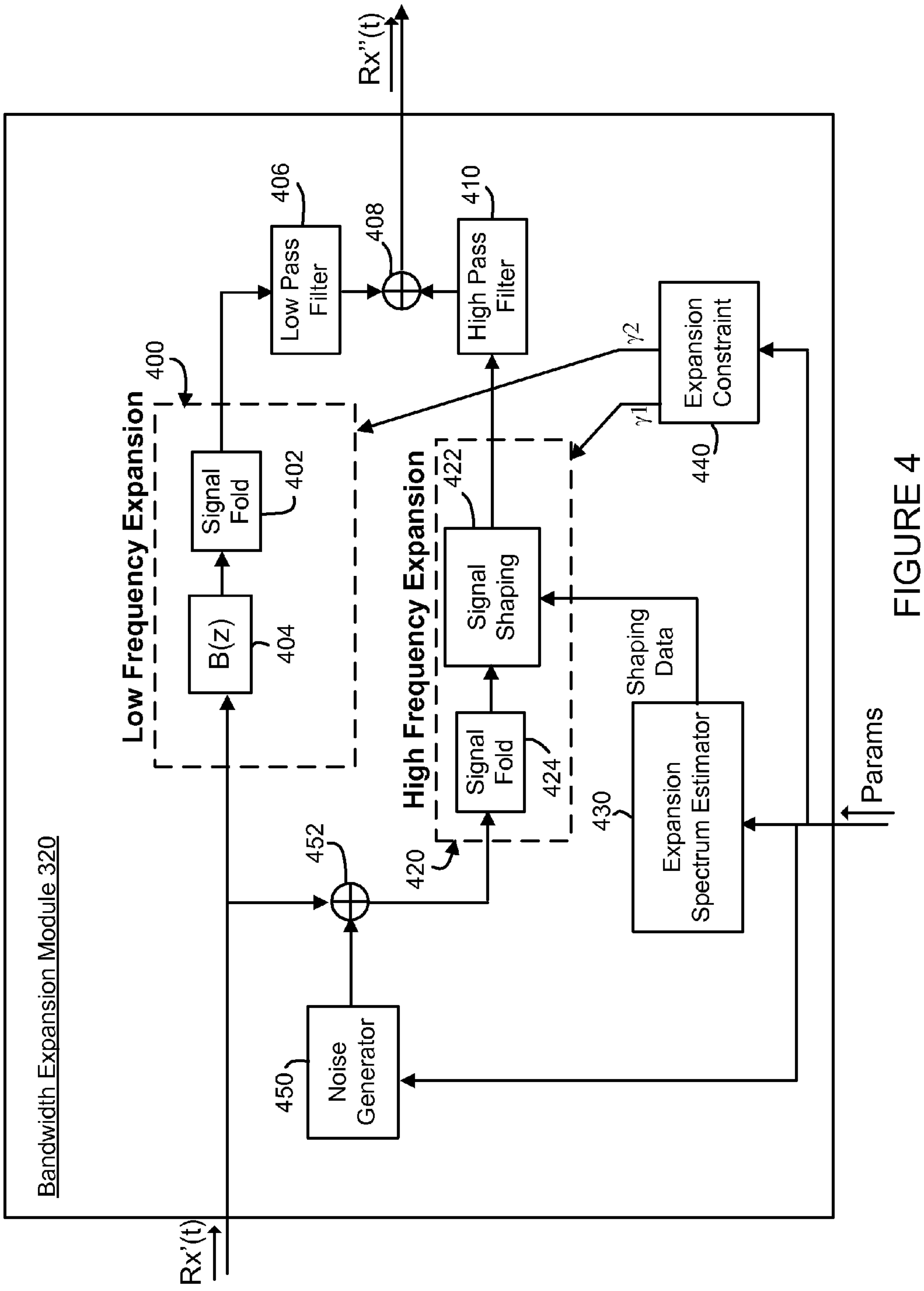
FIG. 4 is a block diagram of an exemplary bandwidth expansion module.

FIG. 4 is a block diagram of an exemplary bandwidth expansion module 320. The bandwidth expansion module 320 may include more or fewer components than those illustrated in FIG. 4, and the functionality of modules may be combined or expanded into fewer or additional modules.

In the illustrated embodiment of FIG. 4, the bandwidth expansion module 320 includes a pair of signal paths for the noise reduced acoustic signal Rx'(t), one signal path via low frequency expansion module 400 and another signal path via high frequency expansion module 420. In some embodiments, the low frequency expansion module 400 may be omitted.

Figure 5A:
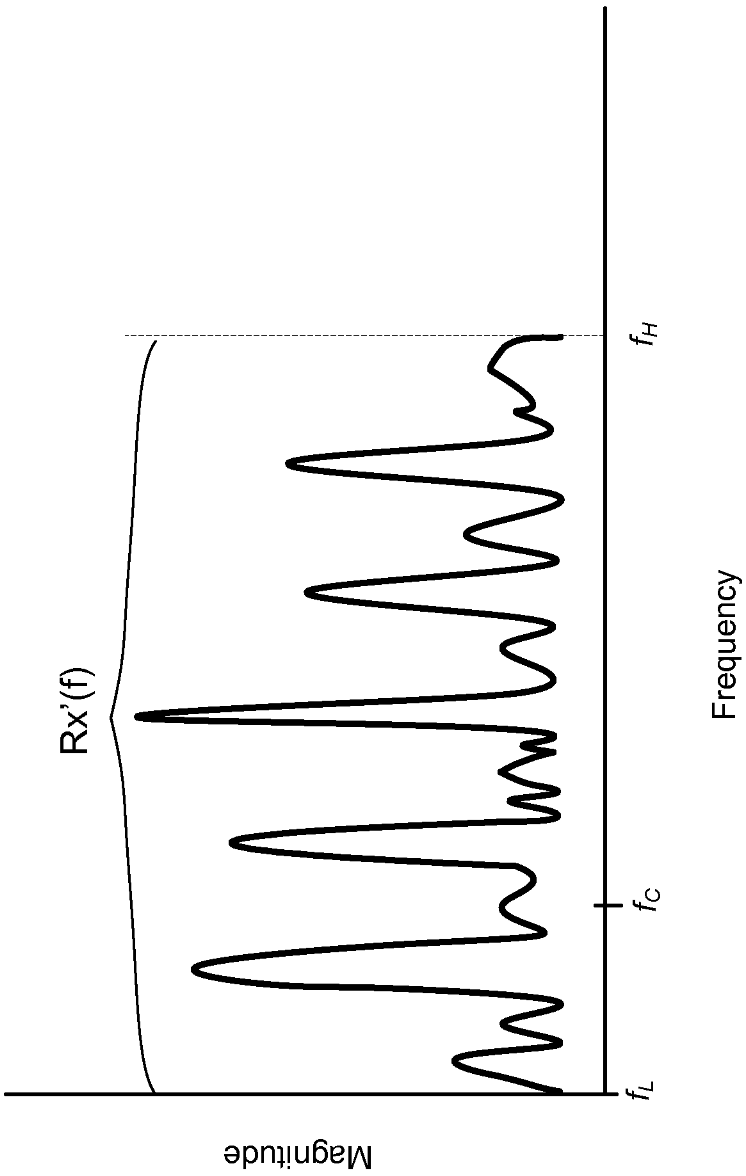
FIG. 5A illustrates an example of spectral values within a narrow bandwidth of a noise reduced acoustic signal in a particular time frame.

FIG. 5A illustrates an example of spectral values Rx'(f) of the narrow band acoustic signal Rx'(t) in a particular time frame. In the illustrated example, the acoustic signal Rx'(t) has a bandwidth between frequency $f_H$ and frequency $f_L$.

Referring back to FIG. 4, the acoustic signal Rx'(t) is processed by the low frequency expansion module 400 to expand the speech bandwidth of the spectrum of the acoustic signal Rx'(t) below a frequency $f_c$. As described below, the expansion by the low frequency expansion module 400 is subject to one or more constraints $\gamma_2$ imposed by expansion constraint module 440 (described below).

Figure 5B:
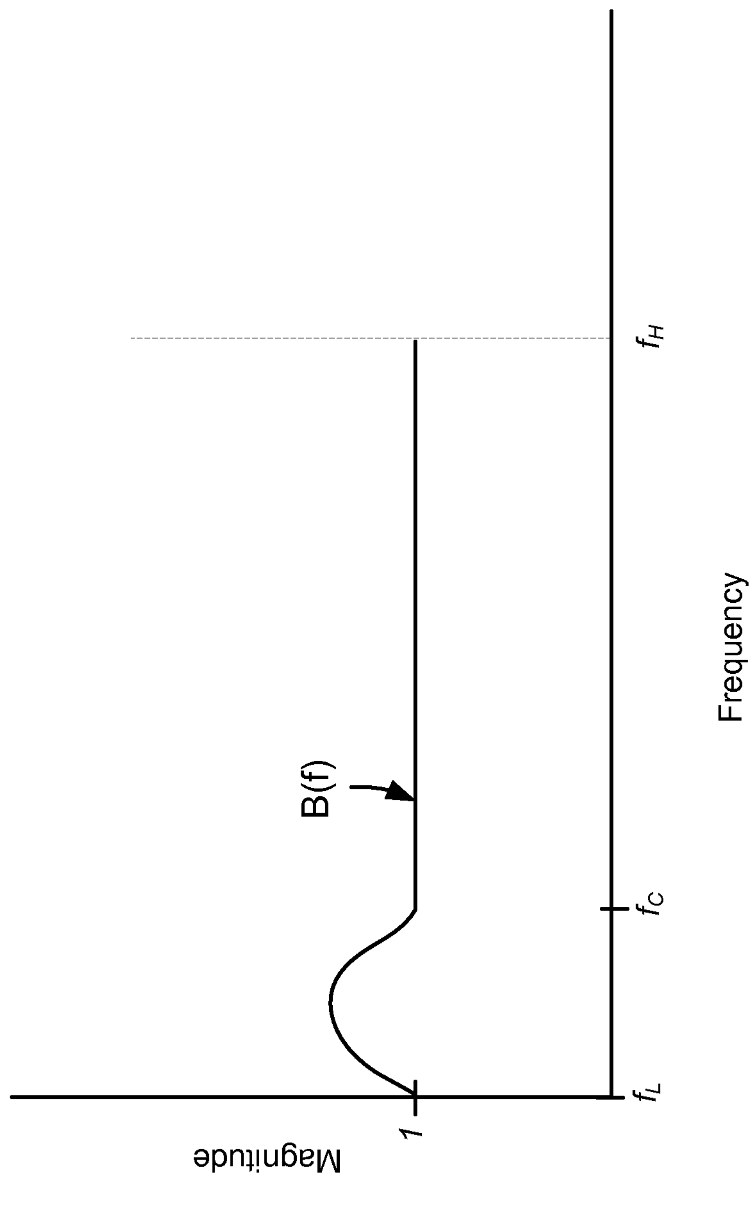
FIG. 5B illustrates an example frequency domain response of a low frequency enhancement filter.

Low frequency enhancement filter module 404 applies a low frequency enhancement filter B(z) to shape acoustic signal Rx'(t) below a frequency $f_c$, subject to the constraints $\gamma_2$ imposed by expansion constraint module 440. FIG. 5B illustrates an example frequency domain response of low frequency enhancement filter B(z). In some embodiments, the response of the low frequency enhancement filter B(z) may be fixed. In such a case, the output of the low frequency enhancement filter B(z) may be provided to gain module (not illustrated) where a gain is applied based on the constraints $\gamma_2$.

Referring back to FIG. 4, the output of the filter module 404 is provided to signal fold module 402. Signal fold module 402 "folds" the output signal. To fold the signal, the sampling of the signal is doubled by inserting samples having a magnitude of zero (0.0) in between each sample. The narrow band signal is up-sampled by two, resulting in a signal with twice the initial sampling rate and a spectrum symmetrical about the half band. The second half (e.g. from $f_H$ to $2f_H$) of the spectrum at high frequencies is a mirror image of the spectrum of the first half (e.g. from $f_L$ to $f_H$). By folding a signal, the signal frequencies appear as a mirror image about the upper frequency $f_H$ of the output signal of the filter module 404.

The folded signal output by the signal fold module 402 is then provided to a low pass filter module 406. The low pass filter module 406 applies a low pass filter to the folded signal to retain the spectrum of the folded signal within the frequency band from $f_L$ to $f_H$. The low pass filtered signal is then provided to combiner 408. As described in more detail below, the combiner 408 combines the low pass filtered signal with a high pass filtered signal provided by high pass filter module 410 to form the expanded acoustic signal Rx"(t). In the illustrated embodiment, the low pass filter module 406 and high pass filter module 410 are implemented as a quadrature mirror filter.

As shown in FIG. 4, the noise reduced acoustic signal Rx'(t) is also provided to the high frequency expansion module 420 via combiner 452. Combiner 452 combines the noise reduced acoustic signal Rx'(t) with a modulated noise signal generated by noise generator 450. The noise generator module 450 modulates the noise signal based on the saliency and the computed narrow band spectral envelope of the acoustic signal Rx'(t). Hence, the noise signal is modulated to provide greater energy at frequencies having higher energy within the noise reduced acoustic signal Rx'(t).

The output of the combiner 452 is then provided to signal fold module 424 within the high frequency expansion module 420. The signal fold module 424 "folds" the signal to expand the frequency spectrum and provides the result to the signal shaping module 422. The signal shaping module 422 applies a filter to shape the spectrum of the folded signal within the expanded bandwidth between frequency $f_H$ and frequency $2f_H$. As described below, this shaping by the filter is based on shaping data provided by the expansion spectrum estimator module 430. The shaping of the spectrum of the folded signal is further subject to one or more constraints $\gamma 1$ imposed by the expansion constraint module 440.

The expansion spectrum estimator module 430 receives parameters Params to determine the signal shaping to be applied by signal shaping module 422. As described in more detail below, the signal shaping is based on the spectral values of the portions of the acoustic signal Rx'(t) which contain speech. In other words, the shaping applied by signal shaping module 422 forms a shaped signal that emulates the wide bandwidth speech spectral values between frequency $f_H$ and frequency $2f_H$ that are missing from the acoustic signal Rx'(t) as a consequence of the imposed bandwidth limitations. The expansion spectrum estimator module 430 is described in more detail below with respect to FIG. 6.

The folded and shaped signal from the signal shaping module 422 is then provided to the high pass filter module 410. The high pass filter module 410 applies a high pass filter to the shaped and folded signal to retain the spectrum within the frequency band from $f_H$ to $2f_H$. The spectrum of the high pass filtered signal within the frequency band from $f_H$ to $2f_H$ is referred to herein as the expanded signal segment.

Figure 5C:
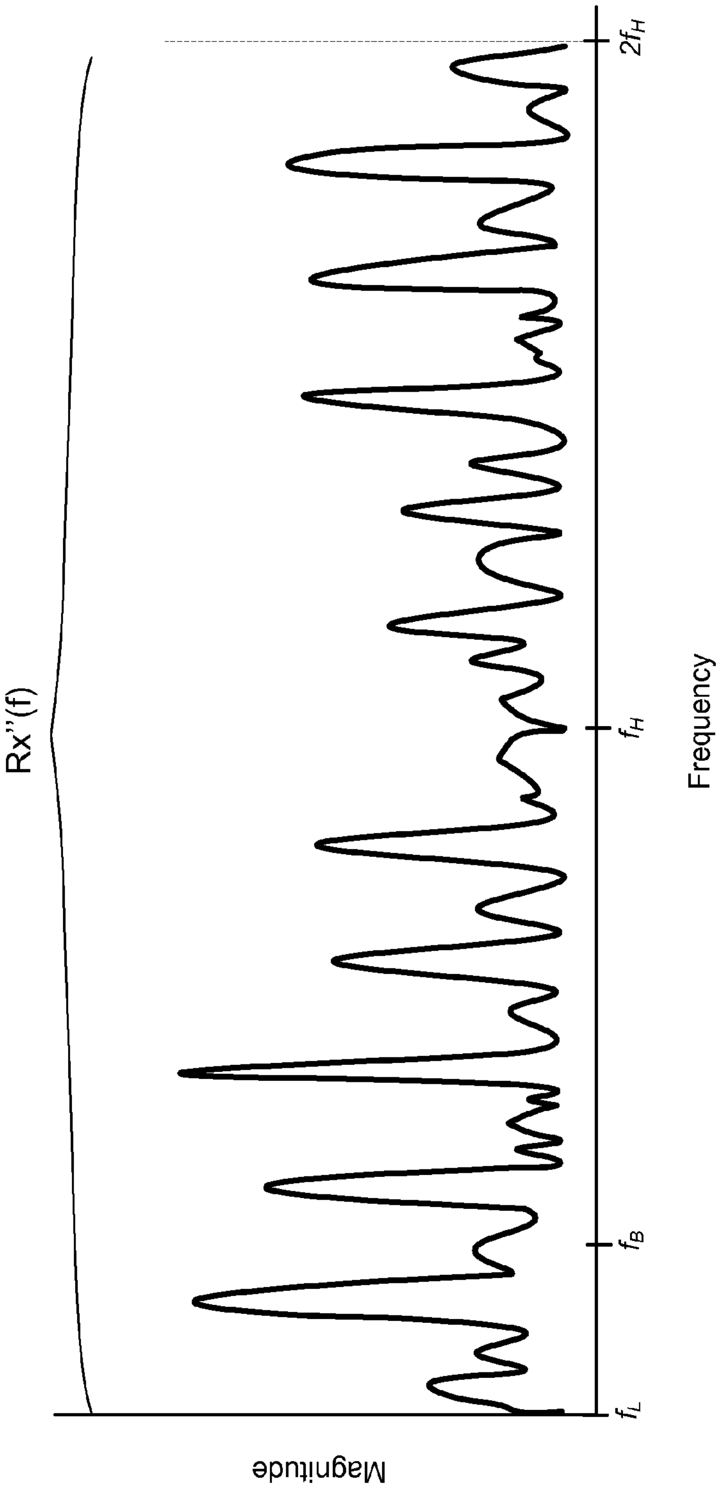
FIG. 5C illustrates an example frequency domain representation of an expanded acoustic signal.

As described above, combiner 408 then combines the low pass filtered signal with the high pass filtered signal provided by high pass filter module 410 to form the expanded acoustic signal Rx"(t). FIG. 5C illustrates an example frequency domain representation Rx"(f) of the expanded acoustic signal Rx"(t) in a particular frame.

Referring back to FIG. 4, the expansion constraint module 440 applies constraints $\gamma_1$ to the low frequency expansion module 400 and constraints $\gamma_2$ to the high frequency expansion module 420 to control when and how the bandwidth expansion is performed on the acoustic signal Rx'(t). The expansion constraint module 440 determines the values of the constraints $\gamma_1$, $\gamma_2$ based on the speech and noise information within the acoustic signal Rx'(t) inferred by the values of the parameters Params. For example, if the values of the parameters Params indicate that a frame of the acoustic signal Rx'(t) is dominated by speech, the values of the constraints $\gamma_1$, $\gamma_2$ enable the low frequency expansion module 400 and the high frequency expansion module 420 to perform the bandwidth expansion described above.

In contrast, if the parameters Params indicate that a frame of the acoustic signal Rx'(t) is dominated by noise, the values of the constraints $\gamma_1$, $\gamma_2$ can limit or prevent the bandwidth expansion during that frame. In doing so, the bandwidth expansion techniques described herein can expand the speech bandwidth and prevent or limit the bandwidth expansion of the noise.

In the illustrated embodiment, the values of the constraints $\gamma_1$, $\gamma_2$ are determined by the expansion constraint module 440 using a continuous soft decision approach based on the values of the parameters Params. Alternatively, the values of the constraints $\gamma_1$, $\gamma_2$ indicating whether or not to expand the bandwidth of the acoustic signal Rx'(t) may be binary.

In the illustrated embodiment, the parameters Params provided to the expansion constraint module 440 include the estimated long-term SNR of the acoustic signal Rx'(t) and the VAD parameter indicating whether speech is dominant within a particular frame. The expansion constraint module 440 then computes the constraints $\gamma_1$, $\gamma_2$ as a function of the SNR subject to the constraint that the VAD indicates that speech is dominant within the particular frame. At medium to low SNR values, the expansion constraint module 440 prevents or restricts the bandwidth expansion of the acoustic signal Rx'(t). At relatively high SNR values, the bandwidth expansion is largely or completely unrestricted.

Figure 6:
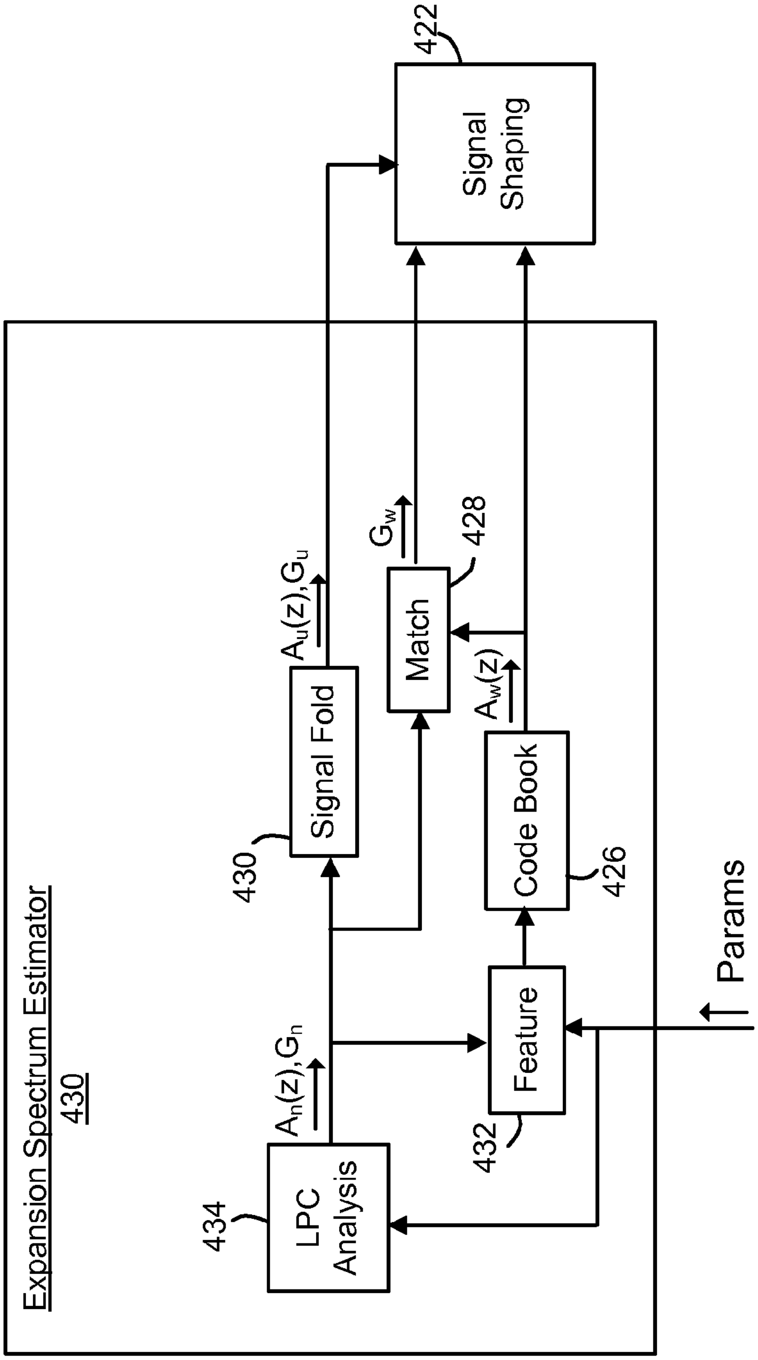
FIG. 6 is a block diagram of an exemplary expansion spectrum estimator module.

FIG. 6 is a block diagram of an exemplary expansion spectrum estimator module 430. The expansion spectrum estimator module 430 may include more or fewer components than those illustrated in FIG. 6, and the functionality of modules may be combined or expanded into fewer or additional modules.

The expansion spectrum estimator module 430 includes a linear predictive coding (LPC) analysis module 434. The LPC analysis module 434 computes LPC coefficients $A_n(z)$ for a filter, where the magnitude of $1/A_n(z)$ closely represents the spectral envelope of the acoustic signal Rx'(t) in a particular frame. The LPC coefficients $A_n(z)$ are computed using the speech and noise information about the acoustic signal Rx'(t) inferred by the values of the parameters Params. In the illustrated embodiment, the LPC coefficients $A_n(z)$ are computed based on the spectrum of the noise and speech energy within the particular frame of the acoustic signal Rx'(t). The LPC coefficients $A_n(z)$ are further based on the noise mask values applied during the formation of the masked frequency sub-band signals Rx'(k) described above.

In the illustrated embodiment, the LPC coefficients $A_n(z)$ are computed by first taking an inverse Fourier transform of the energy spectrum within the particular frame of the acoustic signal Rx'(t). The LPC coefficients $A_n(z)$ are then computed based on the autocorrelation of the result of the inverse Fourier transform. The LPC analysis module 434 also computes a gain value $G_n$ indicating the difference between the LPC coefficients $A_n(z)$ and the energy within the particular frame of the acoustic signal Rx'(t).

Figure 7A:
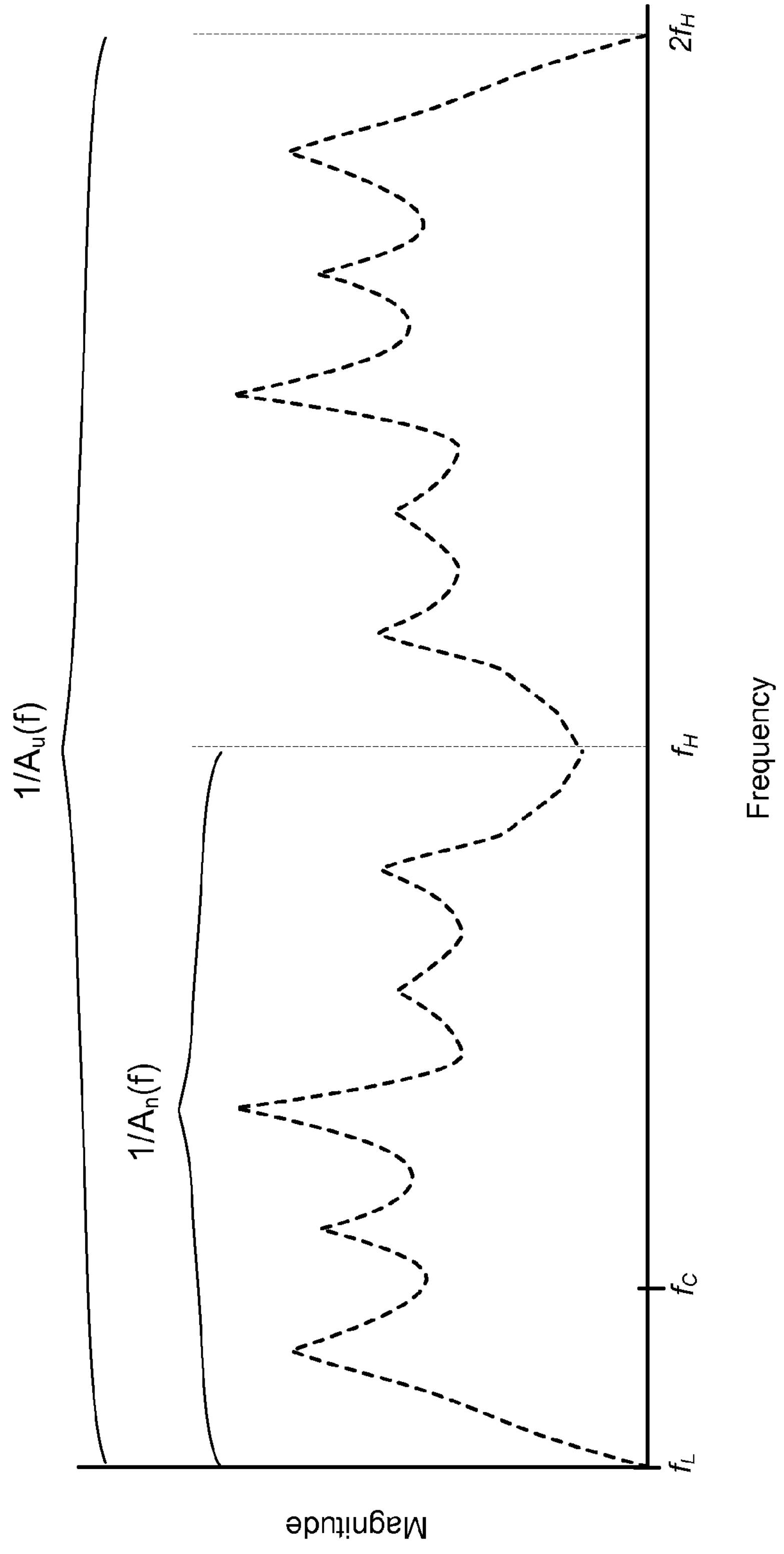
FIG. 7A illustrates an example of frequency domain representation of the narrow band and folded spectral envelopes of an acoustic signal in a particular frame.

The LPC coefficients $A_n(z)$ are provided to signal fold module 430. The signal fold module 430 "folds" the LPC coefficients $A_n(z)$ and gain value $G_n$ to expand the frequency spectrum and form folded LPC coefficients $A_u(z)$ and gain value $G_u$. FIG. 7A illustrates an example frequency domain representation $1/A_n(f)$ of the spectral envelope of the acoustic signal Rx'(t) in a particular frame as given by $1/A_n(z)$. FIG. 7A also illustrates the folded frequency domain representation $1/A_u(f)$ in the particular frame as given by $1/A_u(z)$.

Referring back to FIG. 6, the folded LPC coefficients $A_u(z)$ and gain value $G_u$ are provided to the signal shaping module 422. The LPC coefficients $A_n(z)$ are also provided to feature module 432. The feature module 432 extracts speech feature data based on the LPC coefficients $A_n(z)$. In the illustrated embodiment, the speech feature data are LPC cepstral coefficients $cep_i$ (described below) which represent the LPC coefficients $A_n(z)$.

The LPC cepstral coefficients $cep_i$ form an approximate cepstral domain representation of the LPC coefficients $A_n(z)$. The LPC cepstral coefficients $cep_i$ are computed for each particular time frame corresponding to that of the LPC coefficients $A_n(z)$. Thus, the computed cepstral coefficients $cep_i$ can change over time, including from one frame to the next.

For LPC coefficients $A_n(z)$ in a particular time frame, LPC cepstral coefficients $cep_i$ are coefficients that approximate $A_n(z)$. This can be represented mathematically as:

$$A'_n(z) = \sum_{i=0}^{I-1} cep_i \cdot \cos\frac{2\pi \cdot k \cdot i}{L} \tag{1}$$

where I is the number of LPC cepstral coefficients $cep_i$ used to represent the approximate LPC coefficients $A'_n(z)$, and L is the number of LPC coefficients $A_n(z)$. The number I of cepstral coefficients $cep_i$ can vary from embodiment to embodiment. For example I may be 13, or as another example may be less than 13. In exemplary embodiments, L is greater than or equal to I, so that a unique solution can be found. Various techniques can be used to compute the LPC cepstral coefficients $cep_i$. In one embodiment, the LPC cepstral coefficients $cep_i$ are calculated to minimize a least squares difference between the approximate LPC coefficients $A'_n(z)$ and the actual LPC coefficients $A_n(z)$.

The LPC cepstral coefficients $cep_i$ are provided to a codebook module 426. The codebook module 426 also receives the pitch saliency provided by the noise reduction module 310 as described above. In the illustrated embodiment, the codebook module 426 is empirically trained based on known narrow band and corresponding wide band speech spectral shapes.

The codebook module 426 appends the pitch saliency to the computed cepstral coefficients $cep_i$. The appended result is then compared to those of known narrow band speech spectral shapes to determine the closest entry of LPC cepstral coefficients stored in the codebook module 426.

Figure 7B:
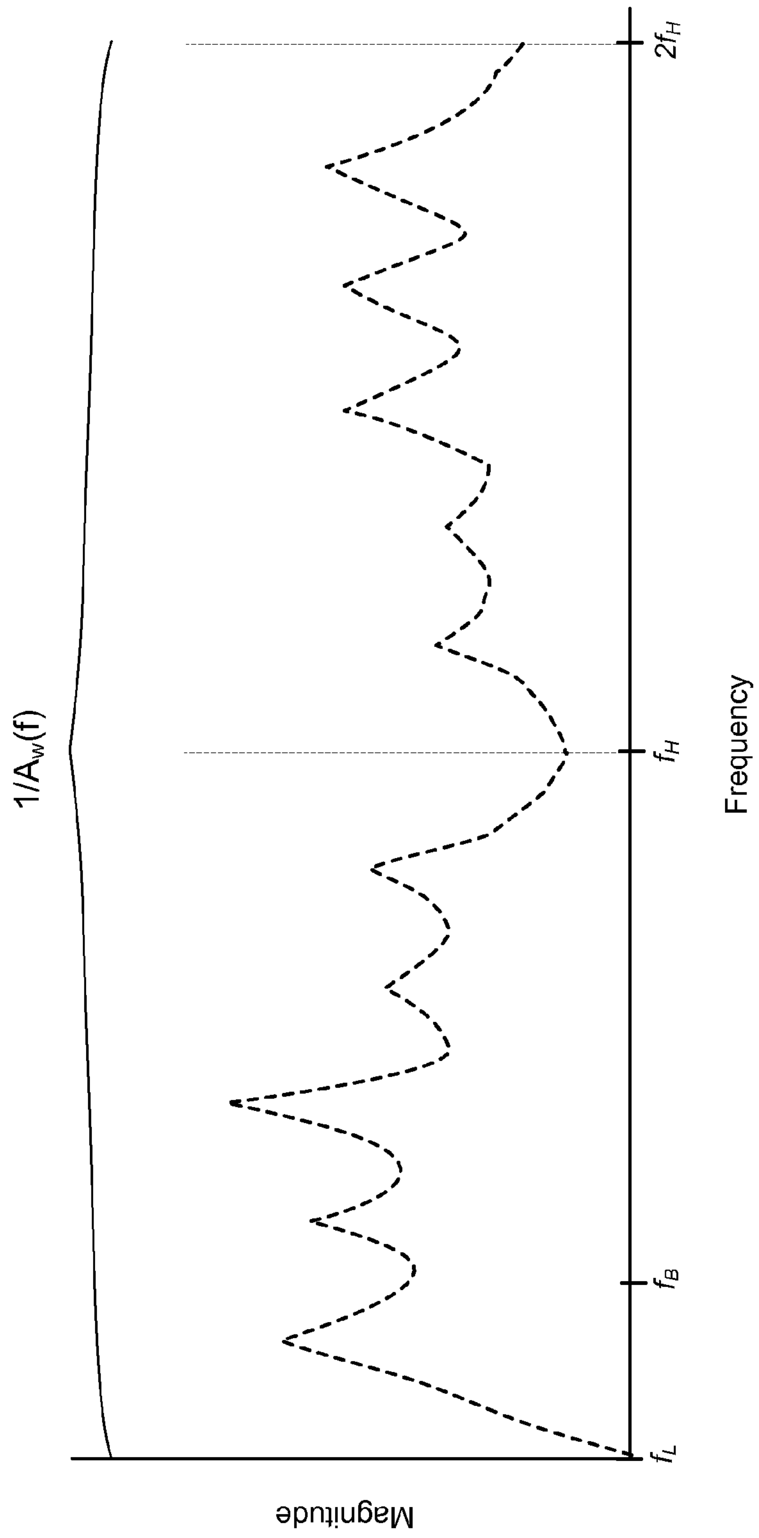
FIG. 7B illustrates an example of the wide band frequency domain representation of the spectral envelope of an expanded acoustic signal in a particular frame.

The speech spectral shape within an expanded bandwidth from $f_H$ to $2f_H$ that corresponds to the closest entry of LPC cepstral coefficients is then selected to form wideband LPC coefficients $A_w(z)$. In doing so, the frequency domain representation of the wideband LPC coefficients $A_w(z)$ within the expanded bandwidth $f_H$ to $2f_H$ represent the spectral envelope of the expanded spectral values of missing speech resulting from the imposed bandwidth limitations. FIG. 7B illustrates an example of the wideband frequency domain representation $1/A_w(f)$ in a particular frame as given by $1/A_w(z)$.

The wideband LPC coefficients $A_w(z)$ are then provided to signal shaping module 422. The wideband LPC coefficients $A_w(z)$ are also provided to match module 428. The match module 428 compares the LPC coefficients $A_n(z)$ with the wideband LPC coefficients $A_w(z)$ within the narrow bandwidth $f_L$ to $f_H$ to compute gain value $G_w$. The gain value $G_w$ indicates the energy level difference between the LPC coefficients $A_n(z)$ with the wideband LPC coefficients $A_w(z)$ within the narrow bandwidth $f_L$ to $f_H$. The gain value $G_w$ is then provided to the signal shaping module 422.

As described above, the signal shaping module 422 uses the shaping data provided by expansion spectrum estimator module 430 to apply the filter. In the illustrated embodiment, the shaping data includes the folded LPC coefficients $A_u(z)$, the wideband LPC coefficients $A_w(z)$, and gain values $G_u$ and $G_w$. The filter applied by the signal shaping module 422 in the illustrated embodiment can be expressed mathematically as:

$$\frac{G_w}{G_u}\frac{A_u(z)}{A_w(z)} \tag{2}$$

Figure 8:
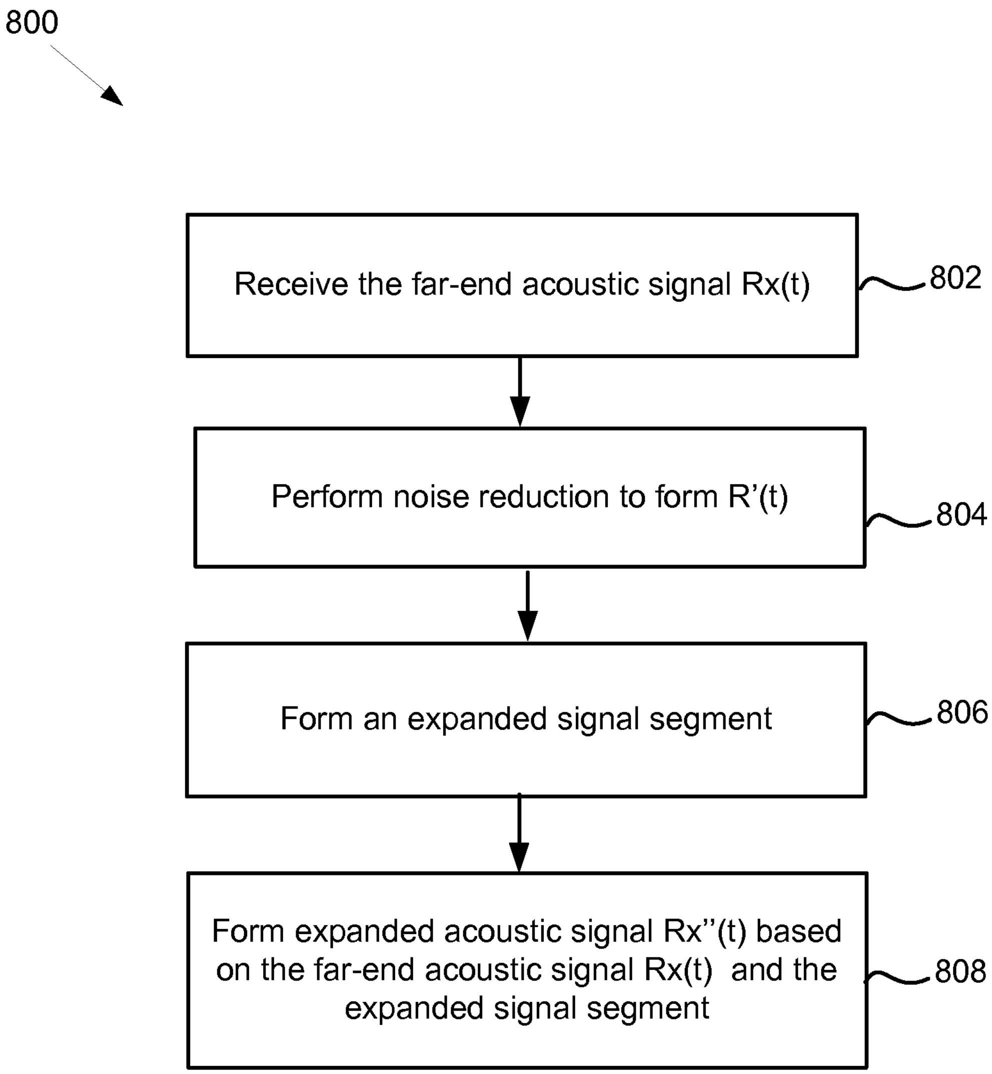
FIG. 8 is a flow chart of an exemplary method for expanding the spectral bandwidth of an acoustic signal as described herein.

FIG. 8 is a flow chart of an exemplary method 800 for expanding a spectral bandwidth of an acoustic signal as described herein. In some embodiments the steps may be combined, performed in parallel, or performed in a different order. The method 800 of FIG. 8 may also include additional or fewer steps than those illustrated.

In step 802, the far-end acoustic signal Rx(t) is received via communications network 114. The far-end acoustic signal Rx(t) includes a noise component n(t) and an initial speech component s(t), and the initial speech component s(t) has spectral values within a first spectral bandwidth. This first spectral bandwidth may be due to bandwidth limitations imposed on the far-end acoustic signal Rx(t) by the communications network 114. The first spectral bandwidth may also or alternatively be due to bandwidth limitations imposed during reception and processing by the audio device 104. The bandwidth limitations may also or alternatively be imposed during processing and transmission by an audio device from which the far-end acoustic signal Rx(t) originated.

In step 804, the far-end acoustic signal Rx(t) is processed to reduce noise and form noise reduced acoustic signal Rx'(t). The noise reduction may be performed by noise reduction module 310.

In step 806, an expanded signal segment is formed. The expanded signal may have spectral values within a second spectral bandwidth outside the first spectral bandwidth. As described above, the expanded signal segment has spectral values based on the spectral values of the speech component and further based on an energy level of the noise component.

In step 808, the expanded acoustic signal Rx"(t) is then formed based on the far-end acoustic signal Rx(t) and the expanded signal segment.

In the discussion above, the expanded signal segment was formed within a bandwidth having a frequency above that of the bandwidth limited acoustic signal. It will be understood that the techniques described herein can also be utilized to form an expanded signal segment within a bandwidth having a frequency below that of the bandwidth limited acoustic signal. In addition, the techniques described herein can also be utilized to form a plurality of expanded signal segments having corresponding non-overlapping bandwidths which are outside that of the bandwidth limited acoustic signal.

As used herein, a given signal, event or value is "based on" a predecessor signal, event or value if the predecessor signal, event or value influenced the given signal, event or value. If there is an intervening processing element, step or time period, the given signal can still be "based on" the predecessor signal, event or value. If the intervening processing element or step combines more than one signal, event or value, the output of the processing element or step is considered to be "based on" each of the signal, event or value inputs. If the given signal, event or value is the same as the predecessor signal, event or value, this is merely a degenerate case in which the given signal, event or value is still considered to be "based on" the predecessor signal, event or value. "Dependency" on a given signal, event or value upon another signal, event or value is defined similarly.

The above described modules may be comprised of instructions that are stored in a storage media such as a machine readable medium (e.g., computer readable medium). These instructions may be retrieved and executed by a processor. Some examples of instructions include software, program code, and firmware. Some examples of storage media comprise memory devices and integrated circuits. The instructions are operational.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for expanding a bandwidth of an acoustic signal, the method comprising:

reducing a noise component in an acoustic signal to produce a noise-reduced signal and noise-reduction parameters, the acoustic signal representing at least one captured sound and having the noise component and a speech component, the speech component having spectral values within a first bandwidth, the noise-reduction parameters indicating characteristics of the speech component and the noise component of the acoustic signal;

forming an expanded signal segment from the noise-reduced signal based at least in part on the noise-reduction parameters, so as to expand a bandwidth of the speech component and limit expansion of a bandwidth of the reduced noise component, the expanded signal segment being bandwidth expanded and having spectral values within a second bandwidth outside the first bandwidth, the spectral values of the expanded signal segment based on the spectral values of the speech component and further based on an energy level of the noise component; and forming an expanded acoustic signal based on the noise-reduced signal and the expanded signal segment.

2. The method of claim 1, wherein the second bandwidth includes a frequency above that of the first bandwidth.

3. The method of claim 1, further comprising forming a second expanded signal segment having spectral values within a third bandwidth outside each of the first and second bandwidths, the spectral values of the second expanded signal segment based on spectral values of the acoustic signal within the third bandwidth, and wherein the expanded acoustic signal is further based on the second expanded signal segment.

4. The method of claim 1, wherein forming the expanded signal segment comprises:

calculating a plurality of coefficients to form an approximate spectral representation of the speech component; and determining the spectral values of the expanded signal segment within the second bandwidth based on the plurality of coefficients.

5. The method of claim 4, wherein the plurality of coefficients are linear predictive coding coefficients.

6. The method of claim 1, wherein the acoustic signal is received over a network via a receiver, and further comprising outputting the expanded acoustic signal via an audio transducer.

7. The method of claim 1, wherein the spectral values of the expanded signal segment are further based on a pitch saliency of the speech component.

8. The method of claim 1, wherein the spectral values of the expanded signal segment are further based on a difference between the speech component and the noise component within the first bandwidth.

9. A non-transitory computer readable storage medium having embodied thereon a program, the program being executable by a processor to perform a method for expanding a spectral bandwidth of an acoustic signal, the method comprising:

reducing a noise component in an acoustic signal to produce a noise-reduced signal and noise-reduction parameters, the acoustic signal representing at least one captured sound and having the noise component and a speech component, the speech component having spectral values within a first bandwidth, the noise-reduction parameters indicating characteristics of the speech component and the noise component of the acoustic signal;

forming an expanded signal segment from the noise-reduced signal based at least in part on the noise-reduction parameters, so as to expand a bandwidth of the speech component and limit expansion of a bandwidth of the reduced noise component, the expanded signal segment being bandwidth expanded and having spectral values within a second bandwidth outside the first bandwidth, the spectral values of the expanded signal segment based on the spectral values of the speech component and further based on an energy level of the noise component; and forming an expanded acoustic signal based on the noise-reduced signal and the expanded signal segment.

10. The non-transitory computer readable storage medium of claim 9, wherein the second bandwidth includes a frequency above that of the first bandwidth.

11. The non-transitory computer readable storage medium of claim 9, further comprising forming a second expanded signal segment having spectral values within a third bandwidth outside each of the first and second bandwidths, the spectral values of the second expanded signal segment based on spectral values of the acoustic signal within the third bandwidth, and wherein the expanded acoustic signal is further based on the second expanded signal segment.

12. The non-transitory computer readable storage medium of claim 9, wherein forming the expanded signal segment comprises:

calculating a plurality of coefficients to form an approximate spectral representation of the speech component; and determining the spectral values of the expanded signal segment within the second bandwidth based on the plurality of coefficients.

13. The non-transitory computer readable storage medium of claim 12, wherein the plurality of coefficients are linear predictive coding coefficients.

14. The non-transitory computer readable storage medium of claim 9, wherein the acoustic signal is received over a network via a receiver, and further comprising outputting the expanded acoustic signal via an audio transducer.

15. The non-transitory computer readable storage medium of claim 9, wherein the spectral values of the expanded signal segment are further based on a pitch saliency of the speech component.

16. The non-transitory computer readable storage medium of claim 9, wherein the spectral values of the expanded signal segment are further based on a difference between the speech component and the noise component within the first bandwidth.

17. A system for expanding a spectral bandwidth of an acoustic signal, the system comprising:

a noise reduction module stored in a memory coupled to a processor, the noise reduction module executable by the processor to determine an energy level of a noise component in an acoustic signal having the noise component and a speech component, the speech component having spectral values within a first bandwidth, and to reduce the noise component in the acoustic signal to produce a noise-reduced signal and noise-reduction parameters, the noise-reduction parameters indicating characteristics of the speech component and the noise component of the acoustic signal; and a bandwidth expansion module stored in the memory coupled to the processor, the bandwidth expansion module executable by the processor to:

form an expanded signal segment from the noise-reduced signal based at least in part on the noise-reduction parameters, so as to expand a bandwidth of the speech component and limit expansion of a bandwidth of the reduced noise component, the expanded signal segment being bandwidth expanded and having spectral values within a second bandwidth outside the first bandwidth, the spectral values of the expanded signal segment based on the spectral values of the speech component and further based on the determined energy level of the noise component, and form an expanded acoustic signal based on the noise-reduced signal and the expanded signal segment.

18. The system of claim 17, wherein the second bandwidth includes a frequency above that of the first bandwidth.

19. The system of claim 17, wherein the bandwidth expansion module forms a second expanded signal segment having spectral values within a third bandwidth outside each of the first and second bandwidths, the spectral values of the second expanded signal segment based on spectral values of the acoustic signal within the third bandwidth, and wherein the expanded acoustic signal is further based on the second expanded signal segment.

20. The system of claim 17, further comprising:

a receiver to receive the acoustic signal over a network; and an audio transducer to output the expanded acoustic signal in response to the expanded acoustic signal.

* * * * *